Figure 3A:
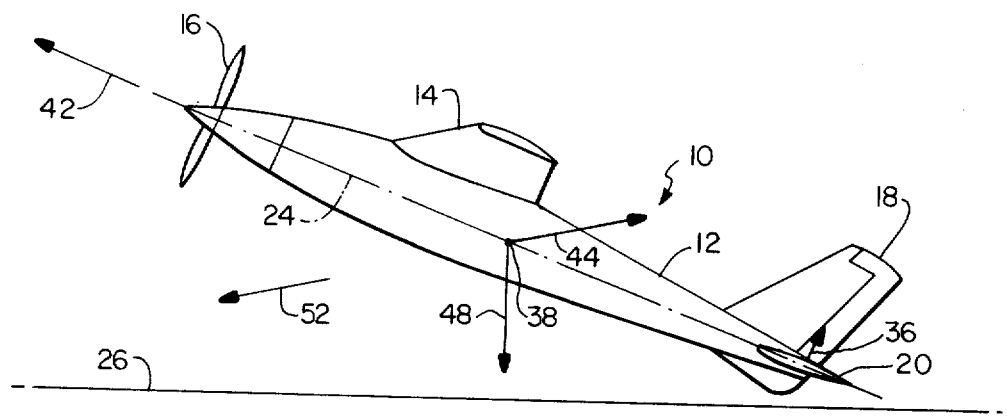

United States Patent [19]

Roberts et al.

[11] 4,261,533
[45] * Apr. 14, 1981

[54] ALL-AXIS CONTROL OF AIRCRAFT IN ULTRA DEEP STALL

[75] Inventors: Lawrence T. Roberts, Kent, Wash.; Thomas H. Strom, Williamsburg, Va.

[73] Assignee: Dynamic Engineering, Inc., Newport News, Va.

[*] Notice: The portion of the term of this patent subsequent to Jul. 11, 1995, has been disclaimed.

[21] Appl. No.: 919,369

[22] Filed: Jun. 26, 1978

Related U.S. Application Data

[63] Continuation of Ser. No. 789,630, Apr. 21, 1977, abandoned, which is a continuation-in-part of Ser. No. 707,789, Jul. 22, 1976, Pat. No. 4,099,687.

[51] Int. Cl.² .................... B64C 27/28; B64C 19/00
[52] U.S. Cl. .................... 244/7 R; 244/87; 244/213
[58] Field of Search .................... 244/7B, 7C, 7R, 82, 244/87, 48, 213, 51

[56] References Cited

U.S. PATENT DOCUMENTS

| 2,719,014 | 9/1955 | Koppen | 244/87 X |
| 4,099,687 | 7/1978 | Roberts et al. | 244/7 R |

Primary Examiner—Barry L. Kelmachter
Attorney, Agent, or Firm—Fidelman, Wolffe & Waldron

[57] ABSTRACT

Tilting the stabilizer at an extreme angle to the fuselage, with leading edge down, and controlling and varying engine thrust comprise a method for all-axis control of a generally conventional aircraft in ultra deep stall. The method is effective in recovery from unstable and unusual flight attributes and in landing emergencies; the aircraft may land in the ultra deep stall configuration or conventional flight may be resumed. So-called flying wing aircraft, where pitch control surfaces are incorporated with the trailing edge of the primary lift surface, are also controllable in ultra deep stall by the method of this invention.

10 Claims, 7 Drawing Figures

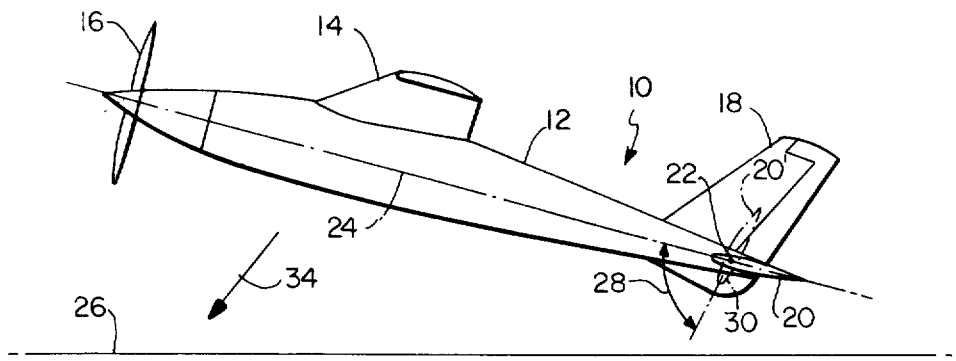
FIG. 1
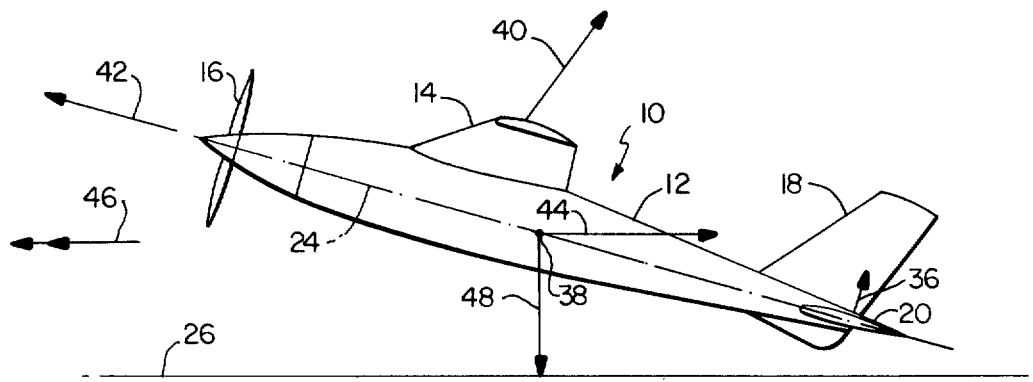
FIG. 2A
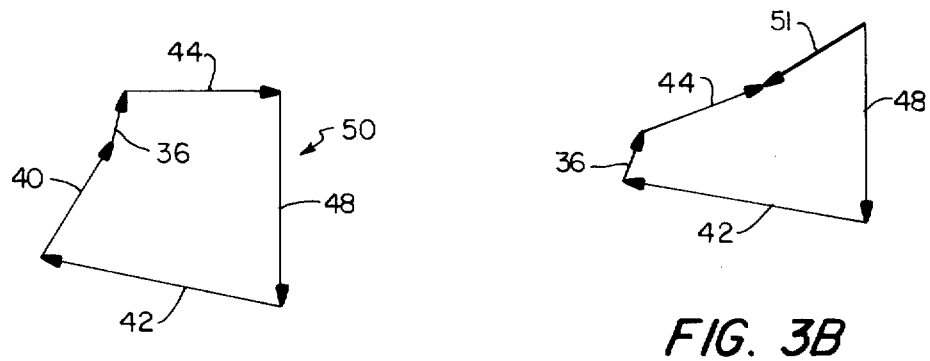
FIG. 2B
FIG. 3B

ALL-AXIS CONTROL OF AIRCRAFT IN ULTRA DEEP STALL

This application is a continuation of Ser. No. 789,630, filed Apr. 21, 1977, now abandoned, which is a continuation-in-part of Ser. No. 707,789, filed July 22, 1976, now U.S. Pat. No. 4,099,687.

BACKGROUND OF THE INVENTION

This invention relates to fixed wing aircraft and, more particularly, to the configuration and method for controlling the flight of aircraft when the primary lifting surface is in deep stall.

It has generally been considered undesirable in normal operation of fixed wing aircraft to operate in deep stall. This condition occurs when the primary lifting surface, the wing, is at so positive an angle relative to the oncoming air flow that flow line separation occurs along essentially the entire upper wing surface and lifting force is lost. The result of such deep stall is generally an uncontrollable and rapid loss of altitude, often accompanied by change in attitude of the aircraft. Control is not regained except as air speed is increased by advancing engine thrust or initiating steep dive into an accelerating drop in altitude to restore normal airflow over lifting and control surfaces. Such flight conditions have ordinarily been avoided, especially at low altitude since many aircraft have insufficient thrust available to regain control and power out of the dive rapidly enough to avoid a crash. Still other aircraft are susceptible to a deep stall condition from which no recovery is attainable by any techniques available in the prior art. In such cases, the aircraft will crash with attendant damage to the craft and high probability of damage or death for occupants.

Typically, the hazard is high under the low speed and low altitude conditions of landing, where high wing lift is necessarily produced by flying close to wing stall conditions. The unintended incidence or inducement of a stall due to air turbulence or over-control might leave little or no time or room for recovery of control—with damaging consequences. The seriousness of the problem is further intensified when landings are required on short runways or over undeveloped landing areas.

Prior art has concerned itself with the role played by the tail surfaces, notably the stabilizer, in efficiently developing the highly positive angle of incidence required of the wing in low-speed flight conditions. The downward force generated at the rear of the fuselage by the stabilizer is used to rotate the aircraft to the wing's maximum unstalled angle of attack. On conventional airplanes having substantially horizontal stabilizers, the downward thrust of the tail section is developed by upwardly tilting the elevator flaps hinged to the rear of the fixed stabilizer surface. However, in this slightly nose-up position of the airplane, the raised elevator flaps cause a downward thrust while, concurrently, the horizontal stabilizer section fixed in relation to the fuselage, generates increased lift (as compared to level flight) in opposition to the raised flaps. To overcome this inefficiency of opposed forces and to increase the down thrust while using smaller tail surfaces, fully tiltable stabilizers have been developed where the entire stabilizer surface rotates leading edge down, relative to the level flight axis of the fuselage. U.S. Pat. Nos. 2,563,757; 2,719,014; and 3,138,353 are illustrative of prior art utilizing tiltable stabilizer surfaces for the double purposes to more efficiently provide downward thrust at the rear of the fuselage and to simultaneously prevent the occurence of stall in an aircraft flying at low speeds.

In none of the prior art is there a method or purpose disclosed to fly an aircraft with the wing fully stalled. Primarily, this is because flight in stalled condition has heretofore been considered uncontrollable and therefore useless or worse. In the past any stall was to be avoided if possible, and remedied rapidly as possible, should such a condition occur inadvertently. The prior art has gone to considerable pains to prevent stalls, and has tended to prevent at almost any cost a deep stall condition with primary lifting surfaces fully stalled.

What is needed is an airplane having essentially normal level flight performance combined with a capability and method of controlled slow descent and landings which are near vertical.

Also needed is an airplane having essentially normal level flight performance combined with a capability and method of recovery from unstable and undesirable flight conditions such as stalls, spins, inverted flight, and the like.

SUMMARY OF THE INVENTION

The instant invention comprises the method of flying an airplane having a fixed wing primary surface and a fully tiltable secondary surface so that completely controlled stable descent is accomplished while the airplane is maintained in a preferred attitude. In the generally conventional fixed wing airplane having a fuselage, the secondary surface is the stabilizer at the tail of the fuselage. In a flying wing type airplane, the secondary surface is the elevons at the trailing edge of the wing. The elevons serve a dual function providing pitch control when tilted simultaneously to the same angle, and providing roll control when tilted simultaneously at opposing angles. The method of this invention is applied to the elevons in their pitch control mode.

The objective of such control is accomplished by fully stalling the main lift surface, i.e., the wing, of the airplane, and compensating for the lost wing-lift by a controlled variation of secondary surface lift and engine thrust. Specifically, the secondary surface is sharply tilted with its leading edge down relative to the chord line of the fixed wing. This controlled flight condition is identified herein as ultra deep stall. The method of this invention produces the stable, ultra deep stall condition regardless of the flight condition and altitude of the aircraft when the method is initiated.

OBJECTS OF THE INVENTION

Therefore, it is an object of this invention to provide a method of controlling a generally conventional aircraft, said aircraft having a tiltable stabilizer, in a nearly vertical descent while maintaining the fuselage at a preferred attitude to the horizontal.

Another object of this invention is to provide a method of controlling a generally conventional aircraft having a tiltable stabilizer when the primary lifting surface is in a continuous deep stall condition.

Yet another object of this invention is to provide a method of recovering control over an aircraft which is flying in an unstable or unusual flight attitude by producing ultra deep stall flight.

A further object of this invention is to provide a method to circumvent or recover from landing emergencies.

Another object of this invention is to provide a method of returning an aircraft to conventional flight from an ultra deep stall flight condition.

Other objects, advantages, and novel features of the present invention will become apparent from the following detailed description of the invention when considered in conjunction with the accompanying drawing in which:

FIG. 1 is a somewhat schematic side elevation view of an airplane having a tiltable stabilizer.

FIG. 2a and b are simplified vector diagrams of forces acting on the airplane of FIG. 1 during conventional landing.

FIG. 3a and b are simplified vector diagrams of forces acting on the airplane of FIG. 1 during an uncontrolled deep stall descent.

Figure 4A:
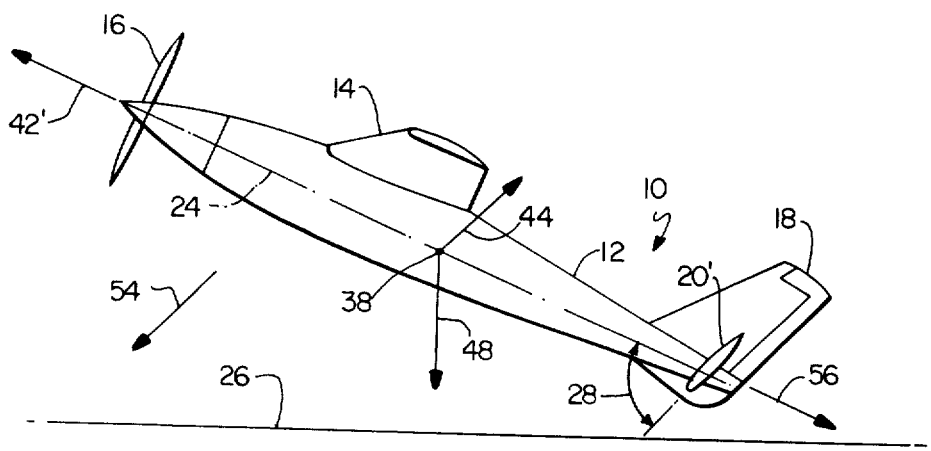

FIG. 4a and b are simplified vector diagrams of forces acting on the airplane of FIG. 1 during a controlled ultra deep stall descent.

DESCRIPTION OF THE INVENTION

As illustrated in FIG. 1, an airplane 10 suitable for control by the method of this invention is comprised of a fuselage 12; a fixed wing 14, which is the craft's primary lifting surface; an engine 16 providing forward thrust; and a vertical rudder surface 18. The stabilizer 20 is a horizontal airfoil surface attached pivotally on a horizontal axis 22 at the rear of the fuselage 12 so that the stabilizer 20 can be oriented with its chord line above or below the longitudinal axis 24 of the fuselage 12 and the chord line of the fixed wing 14 as required for normal pitch control during flight. Additionally, the stabilizer 20 is capable of extreme tilting, with the leading edge of the stabilizer 20 downward, to angles at least as great as 65 degrees away from alignment with the fuselage axis 24 and the chord line of the fixed wing 14. Tilting in the order of 70° to 90° has been effective as explained hereinafter. Means to tilt the stabilizer 20 are well known, form no part of the present invention, and therefore are not described herein.

The airplane 10 of FIG. 1, with the stabilizer generally parallel to the fuselage axis 24, is capable of conventional landings, takeoff and flying maneuvers. However, by utilization of the method of this invention, the airplane 10 is capable of an ultra deep stall flight condition, that is controlled low velocity descent at angles approaching the vertical, while simultaneously maintaining, the fuselage 12 in a preferred flight attitude, e.g., slightly nose-up, from the horizontal 26 (FIG. 1). Nose down attitudes are also used.

In one application of the method of this invention to initiate the desired ultra deep stall descent, the flying speed of a level-flying aircraft 10 is first reduced by decreasing engine thrust to an air speed just above stall conditions. Then by lowering the leading edge of the stabilizer 20, the nose of the aircraft 10 is slowly pulled up above the horizontal 26 until the wing 14 of the aircraft 10 begins to stall. Next, the horizontal stabilizer 20 is tilted about its horizontal longitudinal axis 22 at an angle 28 to the fuselage axis 24 between approximately 70 degrees and 90 degrees, with the leading edge 30 of the stabilizer 20' down relative to the trailing edge. (The prime marking (') denotes the stabilizer in its extremely tilted orientation.) Tilt actuation of the stabilizer 20' causes sufficient upward pitch to the wing 14 to bring about complete, deep stall of the wing surface. But as the airplane 10 descends in the direction of the arrow 34, the stabilizer surface 20' at the extreme angle 28 is believed to be unstalled in the relative air stream and provides stable control for the aircraft 10 in all axes. As the aircraft 10 starts its nearly vertical descent, engine power is increased to compensate for lift which is lost when the wing 14 is stalled and to hold the nose of the airplane 10 above the horizontal attitude 26. Thus, a slow, stable, and nearly vertical descent path 34 is maintained. The thrust of the engine 16 may be varied to control nose attitude and lateral rate of motion, and the airplane 10 can be steered in the usual manner by operation of the rudder 18.

Initiation of the ultra deep stall flight condition is especially suited to emergency landings where a nose-up attitude is preferred and for short or undeveloped runways. Also relatively rapid drops in altitude are accomplished without severe change in fuselage orientation and without travelling extended horizontal distances.

The nearly vertical, controlled descent from horizontal flight has many practical uses. Obviously, as mentioned above, it is advantageously used for landing on short runways and undeveloped fields where an extended run after touchdown is either impossible, undesirable or impractical without damage to the landing gear. This method would also permit "dropping into" small cleared areas surrounded by high obstacles.

Further, when a layer of cloud fog causes low ground ceiling, a pilot not skilled in radio navigation can be directed over a safe area at which point an ultra deep stall, controlled descent can be initiated. When the aircraft has descended nearly vertically and broken out below the fog, the pilot can resume normal flight (as explained later) and proceed to land the aircraft normally under visual control.

The attitude of the nose relative to the horizontal during ultra deep stall descent may be nose-up or nose-down depending upon pilot preference in controlling the amount of thrust supplied by the engine 16. In most landing situations, and in other low altitude situations generally, a nose-up attitude is preferred where ground contact is a real possibility because such an attitude places more energy absorbing structure between the point of contact and the aircraft passengers and crew. Increasing engine thrust tends to raise the nose and to increase the forward horizontal component of flight motion. Diminished thrust provides the opposite effect. The aircraft is also controllable in descent even without engine thrust.

Ultra deep stall can also be initiated by unskilled personnel, should the pilot become disabled or die during flight, and automatic dead-man apparatus may be developed to accomplish this transition to ultra deep stall.

Although it is not known by exactly what aerodynamic phenomenon all-axis stability is maintained during ultra deep stall descent of the craft 10 with its main lifting surface 14 in deep stall, several theories offer logical bases upon which such performance may be anticipated. FIGS. 2-4 present a simplified vectorial analysis of forces acting upon the aircraft 10 of FIG. 1 in several stages of flight. Corresponding parts of the airplane bear similar numbers in all FIGS. 1-4.

FIG. 2a illustrates the airplane 10 in generally horizontal flight at low speed prior to a conventional landing maneuver. The stabilizer surface 20 has been tilted slightly below its normal level flight angle relative to the axis 24 of the fuselage 12, producing diminished lift 36 at the tail. This downward tilting of the stabilizer pitches the fuselage 12 about its center of gravity 38 to a somewhat nose up attitude as shown. The net force 36 on the stabilizer 20 is upward as a result of the high velocity air flow from the propulsion system and the forward motion of the airplane. The wing 14, not yet stalled, produces lift 40 upward and generally perpendicular to the wing chord; and the thrust 42 of the engine 16 is forward and parallels the axis 24 of the fuselage 12. The net drag of the airplane is shown as a force 44 acting through the center of gravity 38 in a direction opposite to the path of travel of the aircraft which path is generally horizontal as indicated by the arrow 46. The weight 48 of the aircraft is shown vectorially acting vertically downward through the center of gravity 38.

A summation of these vectorial forces, FIG. 2b, can produce a closed polygon 50 indicative of horizontally and vertically stable flight. Also, the counterbalancing moments of wing lift 40 and stabilizer lift 36 acting on opposite sides of the center of gravity 38 can provide pitch stability. Thus, by proper balancing of these forces, stable flight can be maintained at low speed with the primary lifting surface 14 near stall.

This is known in the prior art as cited above. In accordance with the well known principles of statics and dynamics any imbalance in forces will vectorially produce an unclosed polygon, and the aircraft will be accelerated by the resultant unbalanced component. Thus, failure to close the polygon of FIG. 2b, for example, due to a lowered vertical component of engine thrust will cause a downward resultant force and acceleration of the aircraft in that direction. The pilots skill and intent, interacting with air conditions, determine, while the aircraft is controllable, what the flight motion will be and whether the theoretical vector polygon is closed or not closed.

When the wing 14 is pivoted to a greater angle of attack, deep stall of the wing surface 14 occurs. Wing lift vanishes (FIG. 3a) and the vertical forces are unbalanced leaving a resultant force 51 (FIG. 3b) which causes the plane 10 to lose altitude as indicated by the arrow 52. Stabilizer lift force 36 persists and perhaps increases due to a more positive angle of incidence relative to the air stream as the plane 10 descends. Thus, the tail rises unopposed by a counterbalancing wing lift force and, pivoting about the center of gravity 38, the nose of the airplane 10 falls. This unstable pattern or stall followed by a dipping of the nose is well known in conventional aircraft.

FIG. 4a illustrates the effect of extreme rotation of the stabilizer surface 20' leading edge downward as prescribed in the ultra deep stall method of this invention. This operation of the stabilizer 20' is completed to convert a near-stall condition (as in FIG. 2) into deep stall of the wing 14 and thereby eliminates the lift force normally produced by the wing 14. Please see FIG. 4a. The plane 10 commences its descent in the direction as indicated by the arrow 54. As before, the weight force 48 acts vertically downward through the center of gravity 38; and the net drag force 44 acts upward and rearward opposite to the direction 54 of travel of the aircraft.

However, the force 56 produced by the extremely tilted stabilizer 20' is acting downwardly and rearwardly; first, because the air stream from the propulsion system impinges on the upper stabilizer surface 20' rather than passing over it; and secondly, because the stabilizer surface 20' now has a negative angle of attack relative to the direction 54 of the aircraft's travel. Either force alone might be sufficient to produce the downward force 56.

Figure 4B:
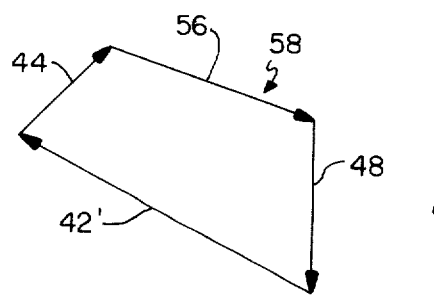

It is shown in FIG. 4b that these forces, when combined vectorially in proper magnitude can produce a closed polygon 58 indicating vertical and horizontal stability of the craft 10 along its direction 54 of travel.

The angle 28 of the stabilizer surface 20' and thus the magnitude and direction of force it produces are controllable. Also, engine thrust 42' is controllable and is increased to overcome the increased tail drag. So by manipulation of these forces, the operator can in effect close the force polygon 58 and in accordance with the theory herein proposed, provide vertical and horizontal stability as the plane moves along its downward path 54. All forces act substantially through the center of gravity 38 of the aircraft 10 thus providing pitch stability as well. However, no claim of actual knowledge is made for the actual aerodynamic phenomenon by which the flight stability in ultra deep stall is attained by the method of this invention.

For example, another theory of operation holds that the aircraft in ultra deep stall is trapped in its own vortex and held in the normal upright attitude. The rate of descent is low due to the resulting high drag of the craft and the lift created over the surfaces by the vortex flow. Whatever the explanation may be the ultra deep stall descent is controllable, stable and much slower than a free fall.

Further, as stated above, an aircraft in the ultra deep stall mode of flight, is entirely steerable during descent by operation of the rudder in the conventional manner.

In addition to applying this method of producing controlled flight in ultra deep stall for the purpose of landing an aircraft for short landing or emergency conditions as described above, the method may be used for recovery of the aircraft from unstable and unusual flight conditions. In every instance the transition between unstable flight and ultra deep stall is accomplished within a very short time period.

These unusual and unstable flight conditions include stalls, spins, which follow a stall, inverted flight and extreme nose-up or nose-down condition and extreme roll (including spins), and the like, and combinations thereof. These flying conditions can and do occur in clear sky due to invisible wind shear or turbulence either from natural causes or by wake interference of larger aircraft. These flying conditions can and do occur in clouds or overcast wherein a pilot may become disoriented, i.e., lose his sense of attitude, especially when the lack of visibility is combined with high winds and turbulence.

The stall is conventionally controllable by dipping the nose and accelerating until speed and wing lift is regained. However, when altitude is low there is little or no room for diving and many pilots fearing impact pull back on the control (raise the elevator flaps). Pulling back on the control is ineffective since the wing has no lift; a crash is likely. In such erroneous action the pilot omits to perform the one act which might save the craft, namely, diving, accelerating and then hopefully pulling out before impact.

With the method of this invention, when stall has occured, the pilot merely tilts the stabilizer fully, and promptly enters into the controlled, stable ultra deep stall descent.

Recovery from inverted flight is normally accomplished by a half-loop or roll. Also, a steep roll is controllable. However, both these situations now require for recovery an awareness by the pilot that such a condition exists. A disoriented pilot, as described above, might not realize his flight attitude and not respond. With the method of this invention, a pilot flying without visual observance of the earth's surface, can periodically or at moments of doubt, initiate ultra deep stall flight which will promptly place the aircraft in an upright attitude, if it was inverted or rolling, and in controlled, stable near vertical descent. From this stable, oriented condition normal flight is resumed.

Another common dangerous situation occurs inadvertently and frequently in landing a plane because of the flight patterns in use at most airports. The airplane approaches out of a rectangular pattern at right angles to the runway, descending crosswind. Then in the final turn to the runway the plane is turned to point into the wind. A pilot who has not turned soon enough finds his plane failing to align with the runway. The customary response is to tighten the turn. Most accidents occur at this time when the plane stalls; the situation is compounded and more likely to occur when the air is turbulent. Some planes then roll inside with nose down; some roll outside with nose up. Lacking control, because of stall, and lacking altitude for normal stall recovery, a crash is imminent.

With the method of this invention, should stall occur during the final turn to the runway, for any reason, the pilot merely tilts the stabilizer surface fully and the aircraft promptly enters the stable, controllable, nearly vertical, ultra deep stall descent.

Should the pilot of an aircraft die or for other reasons be disabled from flying the craft, then initiation of ultra deep stall, automatically or by the action of other personnel, can rapidly place the aircraft into a slow, controlled, stable descent with a nose-up attitude. On ground impact, should it occur, more energy will be absorbed before passengers are affected by deformation of the fuselage structure from the rear as compared to a nose-first impact.

As stated above, to produce ultra deep stall from all conditions the stabilizer 20 is tilted to the extreme position 20' with leading edge downward at an angle 28 to the axis 24 of the fuselage 12 in the range of about 70° to 90°. While in the landing examples described above the airspeed of the aircraft 10 has been reduced prior to fully tilting the stabilizer 20, this is not a prerequisite to initiation of ultra deep stall flight. The stabilizer may be tilted at any airspeed, although the structural stresses produced in the aircraft are higher when airspeed is higher. For this reason, where the choice exists, forward speed is preferably reduced prior to fully tilting the stabilizer to initiate ultra deep stall flight. Fortunately, during landing and spins speed is normally low. An aircraft in high speed flight went into a tight, high-g loop when the stabilizer was suddenly tilted, but the craft then assumed the ultra deep stall descent condition as described previously.

Return of the aircraft from ultra deep stall flight to conventional, horizontal, forward flight, or to any desired flight mode, is accomplished merely be returning the stabilizer surface from the steeply tilted condition to its normal orientation relative to the axis 24 of the fuselage 12, i.e. from the stabilizer position indicated in FIG. 1 and 4A as 20' to the position indicated in FIG. 1 as 20. Then the pilot controls engine thrust and conventionally operates all controls to accommodate the desired flight mode, e.g. level, bank, climb, descent, etc. Generally when the stabilizer is returned to its normal condition, the nose of the aircraft drops and there is a modest loss in altitude until airspeed is regained. No flight instability is experienced during the transition.

Operation of the system can be manual, remote or programmed to automatically actuate the stabilizer mechanism in order to initiate ultra deep stall and then to maintain control in all axes.

It should be understood that the aircraft in FIGS. 1-4 are by way of illustration and example and are not to be taken as a limitation to the spirit and applications of this invention. For example, the aircraft engines may be of any type, e.g., jet, propeller or reaction motors. Also, the high velocity flow of air from the engine may be released aft of the stabilizer surface rather than forward as illustrated in FIGS. 1-4. Additionally, the airplane may be of either high wing, low wing design or a biplane and conventional elevator flaps may be used with the stabilizer 20 of FIG. 1 for conventional flight maneuvers.

EXAMPLE I

An aircraft of the general configuration shown in FIG. 1, and having a wing span of six feet, has been operated remotely by radio control. The aircraft has conventional controls with the exception of the stabilizer which is tiltable, leading edge down, to an angle in the range of 65 to 90 degrees from the horizontal axis of the fuselage.

In flight the aircraft was caused to roll. Then the stabilizer was fully tilted, leading edge down, to an angle between 70 and 90 degrees from the horizontal axis of the fuselage. In less than one second the plane was in the stabilized, ultra deep stall descent condition.

EXAMPLE II

The aircraft of Example I while in flight was caused to fully stall by increasing the angle of attack of the wing. After stall occured the nose of the craft dropped and the plane started to rapidly lose altitude. Then the stabilizer was fully tilted, leading edge down, to an angle between 70 and 90 degrees from the horizontal axis of the fuselage. In less than one second the plane was in the stabilized, ultra deep stall descent condition.

EXAMPLE III

The aircraft of Example I while in flight was caused to fly inverted. Then the stabilizer was fully tilted, leading edge downward, to an angle between 70 and 90 degrees from the horizontal axis of the fuselage. In less than one second the aircraft had righted itself and was in the stabilized, ultra deep stall descent condition.

EXAMPLE IV

The aircraft of Example I was in horizontal flight. Then the stabilizer was fully tilted, leading edge down, to an angle between 70 and 90 degrees from the horizontal axis of the fuselage. In less than one second the aircraft was in the ultra deep stall descent condition. Descent was continued until the aircraft was landed.

EXAMPLE V

The aircraft of Example I in flight was placed into a dive. The stabilized ultra deep stall descent condition was produced within one second of fully tilting the stabilizer, with leading edge down, at an angle of 70 to 90 degrees from the horizontal axis of the fuselage.

EXAMPLE VI

The aircraft of Example I in flight was placed into a climb. The stabilized ultra deep stall descent condition was produced within one second of fully tilting the stabilizer, with leading edge down, at an angle of 70 to 90 degrees from the horizontal axis of the fuselage.

EXAMPLE VII

The aircraft of Example I in flight had its engine cut off. Within one second of fully tilting the stabilizer, with leading edge down, at an angle of 70 to 90 degrees from the horizontal axes of the fuselage, the aircraft was in the ultra deep stall descent condition.

EXAMPLE VIII

The aircraft of Example I was placed into the ultra deep stall descent condition by fully tilting the stabilizer. In less than one second the aircraft was returned to conventional flight by reverting the stabilizer from the fully tilted ultra deep stall position, with leading edge down at an angle of 70 to 90 degrees from the horizontal axis of the fuselage, to the conventional position substantially parallel with said axis of the fuselage. After the stabilizer reversion, engine thrust was adjusted for normal flight maneuvers.

In all of the examples described above, the aircraft was steerable to the left or right during ultra deep stall descent by operation of the rudder in the conventional manner.

What is claimed:

1. A method for controlling the flight of a generally conventional airplane, said airplane having a fuselage with nose and tail, a fixed wing as the primary lifting surface, a rudder at the tail for yaw control, a power system for generating forward thrust substantially parallel to the longitudinal axis of said fuselage, and a generally planar fully tiltable, by rotation about a transverse horizontal axis, stabilizer surface at said tail for pitch control, comprising the steps of:

tilting said stabilizer surface, leading edge downward relative to said longitudinal axis of said fuselage, until the angle of said primary lifting surface relative to the oncoming air flow is positively increased to approach stalling;

further tilting said stabilizer surface with leading edge downward relative to said longitudinal axis of said fuselage, until the angle of said primary lifting surface relative to said oncoming air flow is further positively increased and stall of said primary lifting surface is induced;

further tilting said stabilizer surface with leading edge downward at an extreme angle of approximately 65 to 90 degrees relative to said longitudinal axis of said fuselage, until the angle of said primary lifting surface relative to said oncoming air flow is positively increased such that substantial flow line separation occurs along said primary lifting surface causing deep stall of said primary lifting surface;

varying said power system thrust whereby the attitude and flight path of said airplane is controlled during deep stall of said primary lifting surface.

2. A method for controlling the stalled landing descent of a generally conventional airplane, said airplane having a fuselage with nose and tail, a fixed wing as the primary lifting surface, a rudder at the tail for yaw control, a power system for generating forward thrust substantially parallel to the longitudinal axis of said fuselage, and a generally planar fully tiltable stabilizer surface at said tail for pitch control, comprising the steps of:

reducing the airspeed of said airplane in substantially level flight and tilting said stabilizer surface, leading edge downward, to produce near stall conditions on said primary lifting surface;

further tilting said stabilizer surface with leading edge downward to induce stalling of said primary lifting surface;

further tilting said stabilizer surface with leading edge downward at an extreme angle of approximately 65 to 90 degrees with respect to said longitudinal axis of said fuselage to produce deep stall of said primary lifting surface;

increasing said thrust of said power system to orient said axis of said fuselage above the horizontal with said nose higher than said tail; and varying said power system thrust to control the rate of descent, said rate of descent being arrested when said thrust is increased and said rate of descent being accelerated when said thrust is decreased.

3. A method for altering the flight of a generally conventional airplane, said airplane having a fuselage with nose and tail, a fixed wing as the primary lifting surface, a rudder at the tail for yaw control, a power system for generating forward thrust substantially parallel to the longitudinal axis of said fuselage, and a generally planar fully tiltable, by rotation about a transverse horizontal axis, stabilizer surface at said tail for pitch control, from a first flight mode to controlled, stable, ultra deep stall flight and subsequently entering said airplane into a conventional flight mode, comprising the steps of:

fully tilting said stabilizer surface, leading edge downward to an extreme angle of about 65 to 90 degrees relative to said longitudinal axis of said fuselage, thereby causing deep stall of said primary lifting surface;

varying said power system thrust to produce stable descending ultra deep stall flight with said primary lifting surface in said deep stall condition;

maintaining said extreme angle of said stabilizer surface until a selected change in airplane altitude is completed;

fully tilting said stabilizer surface, from said ultra deep stall orientation with leading edge fully downward at an angle of about 65 to 90 degrees relative to said longitudinal axis of said fuselage to a normal orientation with said stabilizer surface substantially parallel to said longitudinal axis of said fuselage;

varying said power system thrust and aircraft controls to produce any preferred flight mode.

4. The method of claim 3 wherein said power system thrust was zero during ultra deep stall.

5. A method for controlling the flight of an airplane, said airplane having a fixed wing as the primary lifting surface, a power system for generating forward thrust, and a generally planar fully tiltable, by rotation about a transverse horizontal axis, secondary surface for pitch control, comprising the steps of:

tilting said secondary surface, leading edge downward relative to said chord line of said fixed wing, until the angle of said primary lifting surface relative to the oncoming air flow is positively increased to approach stalling;

further tilting said secondary surface with leading edge downward relative to said chord line of said fixed wing until the angle of said primary lifting surface relative to said oncoming air flow is further positively increased and stall of said primary lifting surface is induced;

further tilting said secondary surface with leading edge downward at an extreme angle in the range of 65 to 90 degrees relative to said chord line of said fixed wing, until the angle of said primary lifting surface relative to said oncoming air flow is positively increased such that substantial flow line separation occurs along said primary lifting surface causing deep stall of said primary lifting surface;

varying said power system thrust whereby the attitude and flight path of said airplane is controlled during deep stall of said primary lifting surface.

6. A method for altering the flight of a generally conventional airplane, said airplane having a fuselage with nose and tail, a fixed wing as the primary lifting surface, a rudder at the tail for yaw control, a power system for generating forward thrust substantially paralled to the longitudinal axis of said fuselage, and a generally planar fully tiltable, by rotation about a transverse horizontal axis, stabilizer surface at said tail for pitch control, from a first flight mode to controlled, stable, ultra deep stall flight comprising the steps of:

fully tilting said stabilizer surface, leading edge downward to an extreme angle of about 65 to 90 degrees relative to said longitudinal axis of said fuselage, thereby causing deep stall of said primary lifting surface;

varying said power system thrust to produce stable descending flight with said primary lifting surface in said deep stall condition;

maintaining said extreme angle of said stabilizer surface until a selected change in airplane altitude is completed.

7. The method of claim 6 wherein said first flight mode is inverted flight.

8. The method of claim 6 wherein said first flight mode is a roll.

9. The method of claim 6 wherein said first flight mode is non-horizontal flight.

10. The method of claim 6 wherein after fully tilting said stabilizer surface, said engine thrust is reduced to zero.

* * * * *